United States Patent [19]
Brown et al.

[11] Patent Number: 5,485,758
[45] Date of Patent: Jan. 23, 1996

[54] METHOD AND APPARATUS FOR SIMULATING VEHICLE SIDE IMPACTS

[75] Inventors: Louis R. Brown, Oxford; Charles E. Steffens, Jr., Washington; Charles E. Kroetsch, Troy; Delmar H. Robbins, Rochester Hills, all of Mich.

[73] Assignee: TRW Vehicle Safety Systems Inc., Lyndhurst, Ohio

[21] Appl. No.: 174,884

[22] Filed: Dec. 27, 1993

[51] Int. Cl.⁶ .................................. G01N 3/30; G01N 17/00
[52] U.S. Cl. .................... 73/865.8; 73/865.3; 73/865.6; 73/12.04; 73/12.09
[58] Field of Search ................................ 73/865.3, 865.6, 73/865.8, 12.01, 12.04, 12.07, 12.09, 12.11; 180/232, 268, 271; 280/827, 828, 1.191, 1.192, 1.201, 728 R, 802; 297/464, 468, 469, 470, 471, 472, 473; 434/66, 67, 68; 213/75 R; 104/259; 49/279

[56] References Cited

U.S. PATENT DOCUMENTS

| | | | |
|---|---|---|---|
| 1,583,109 | 5/1926 | Banschbach | 73/12.04 |
| 3,757,562 | 9/1973 | Goldberg et al. | 73/12 |
| 4,524,603 | 6/1985 | Hargunani et al. | 73/12 |
| 5,098,124 | 3/1992 | Breed et al. | 280/751 |
| 5,224,733 | 7/1993 | Simsic | 280/730 |
| 5,231,253 | 7/1993 | Breed et al. | 200/61.45 R |
| 5,251,931 | 10/1993 | Semchena et al. | 280/73 D |
| 5,322,326 | 6/1994 | Ohm | 280/737 |
| 5,326,133 | 7/1994 | Breed et al. | 280/735 |
| 5,333,899 | 8/1994 | Witte | 280/730 A |
| 5,340,148 | 8/1994 | Faigle et al. | 280/730 A |
| 5,348,342 | 9/1994 | Haland et al. | 280/730 A |

FOREIGN PATENT DOCUMENTS

| 4119788A1 | 7/1992 | Germany | 280/730 A |
|---|---|---|---|

OTHER PUBLICATIONS

Paper entitled "A Simple Side Impact Test Method for Evaluating Vehicle Paddings and Side Structure", by Mats Lindquist, Nov. 4–7, 1991.

Paper entitled "A Dynamic Test Method for a Car's Interior Side Impact Performance", by Anders Ohlund, Venti Saslecov, Nov. 4–7, 1991.

Paper entitled "The Development of a Method for Dynamic Simulation of Side Impact Using a HyGe Accelerator—The S.I.D.E. Procedure", by VM Stephens, DGC Bacon.

*Primary Examiner*—Hezron E. Williams
*Assistant Examiner*—Richard A. Moller
*Attorney, Agent, or Firm*—Tarolli, Sundheim & Covell

[57] ABSTRACT

An apparatus (20) for use in simulating vehicle side impacts includes a target sled (24) and a bullet sled (26). A door structure (46) is disposed on the target sled (24). A seat (44) is disposed on the target sled (24) adjacent to an inner side (58) of the door structure (46) to support a test dummy (22) in a desired relationship with the door structure. A safety apparatus (178) with an air bag (182) is supported adjacent to the door structure (46) and the seat (44). Upon impacting of the bullet sled (26) against an outer side (60) of the door structure (46), the air bag (182) is inflated and the door structure is moved relative to the seat (44). As this occurs, a connector assembly (238) interconnects the door structure (46) and the bullet sled. Continued movement of the bullet sled (26) and door structure (46) relative to the target sled (24) moves the seat (44) along tracks (154 and 156) disposed on the target sled (24). After the bullet sled (26) has moved the door structure (46) to a predetermined position relative to the target sled (24), the bullet sled engages the target sled and moves the target sled and the deceleration of the bullet sled and target sled are controlled.

64 Claims, 7 Drawing Sheets

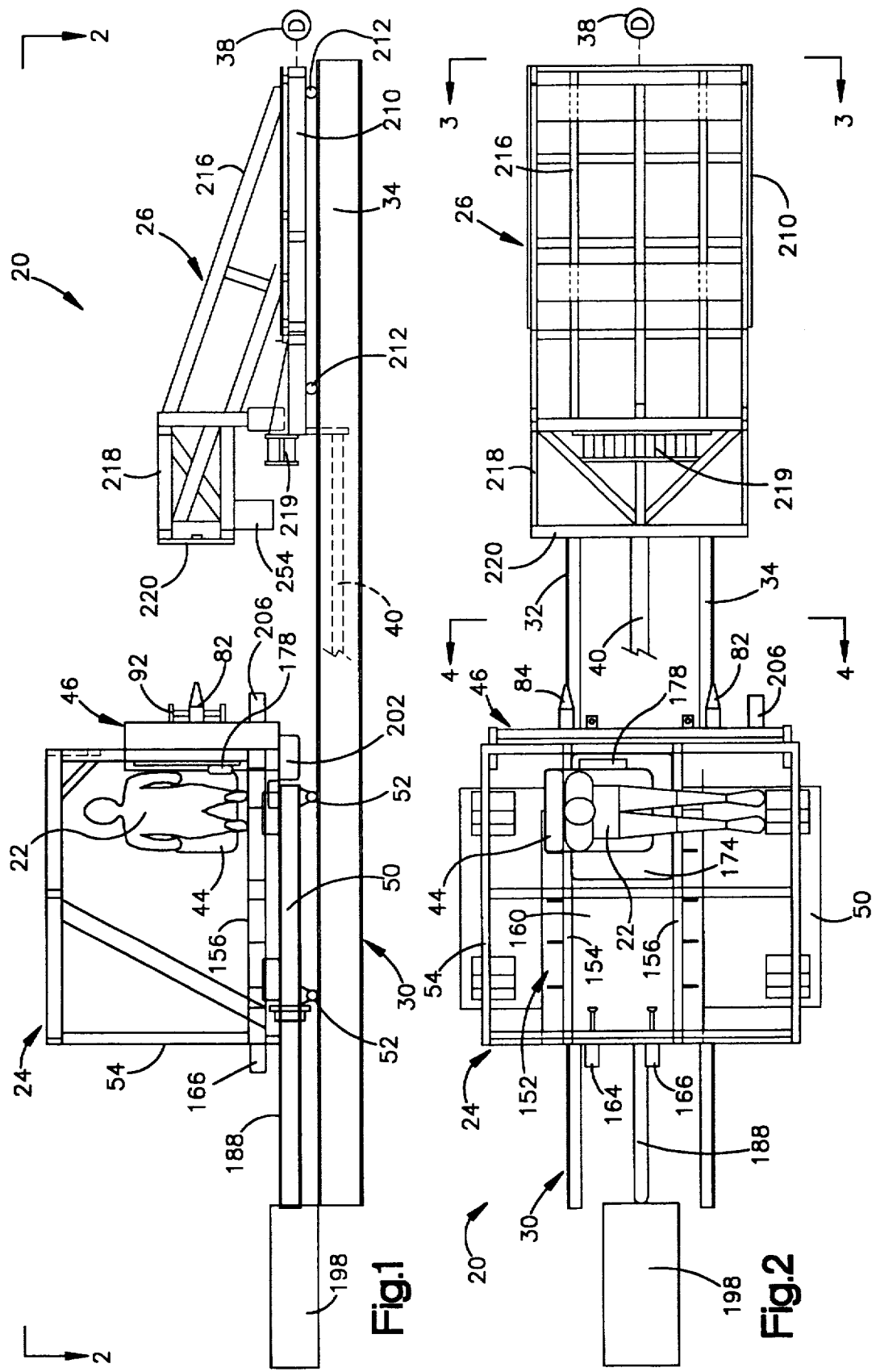

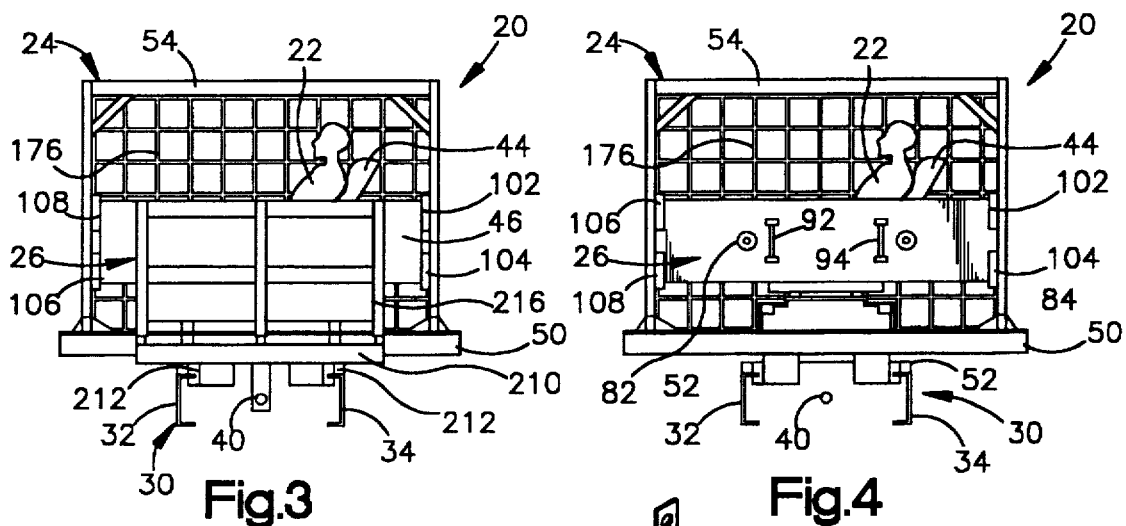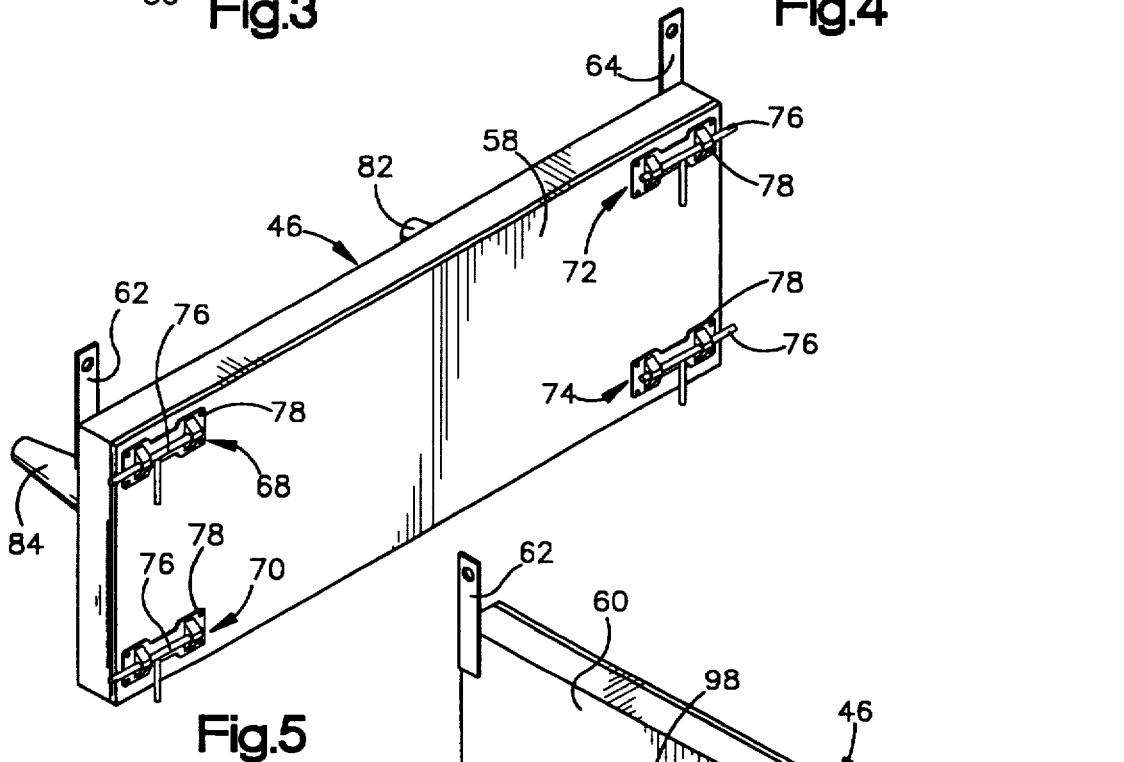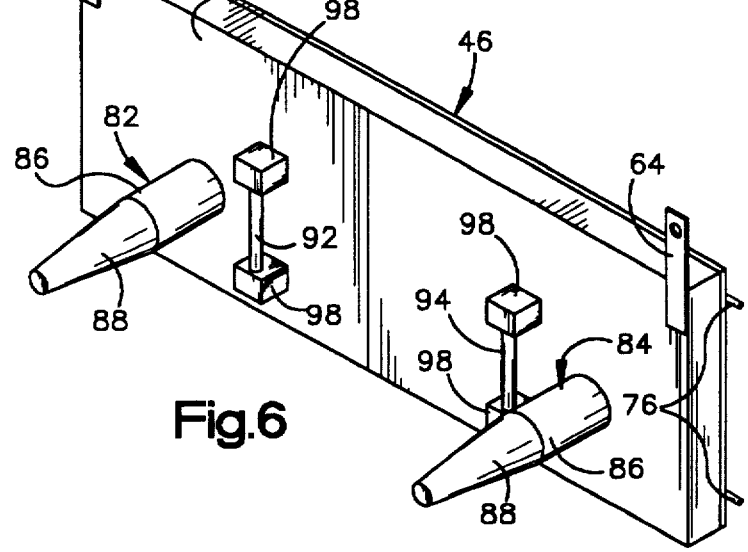

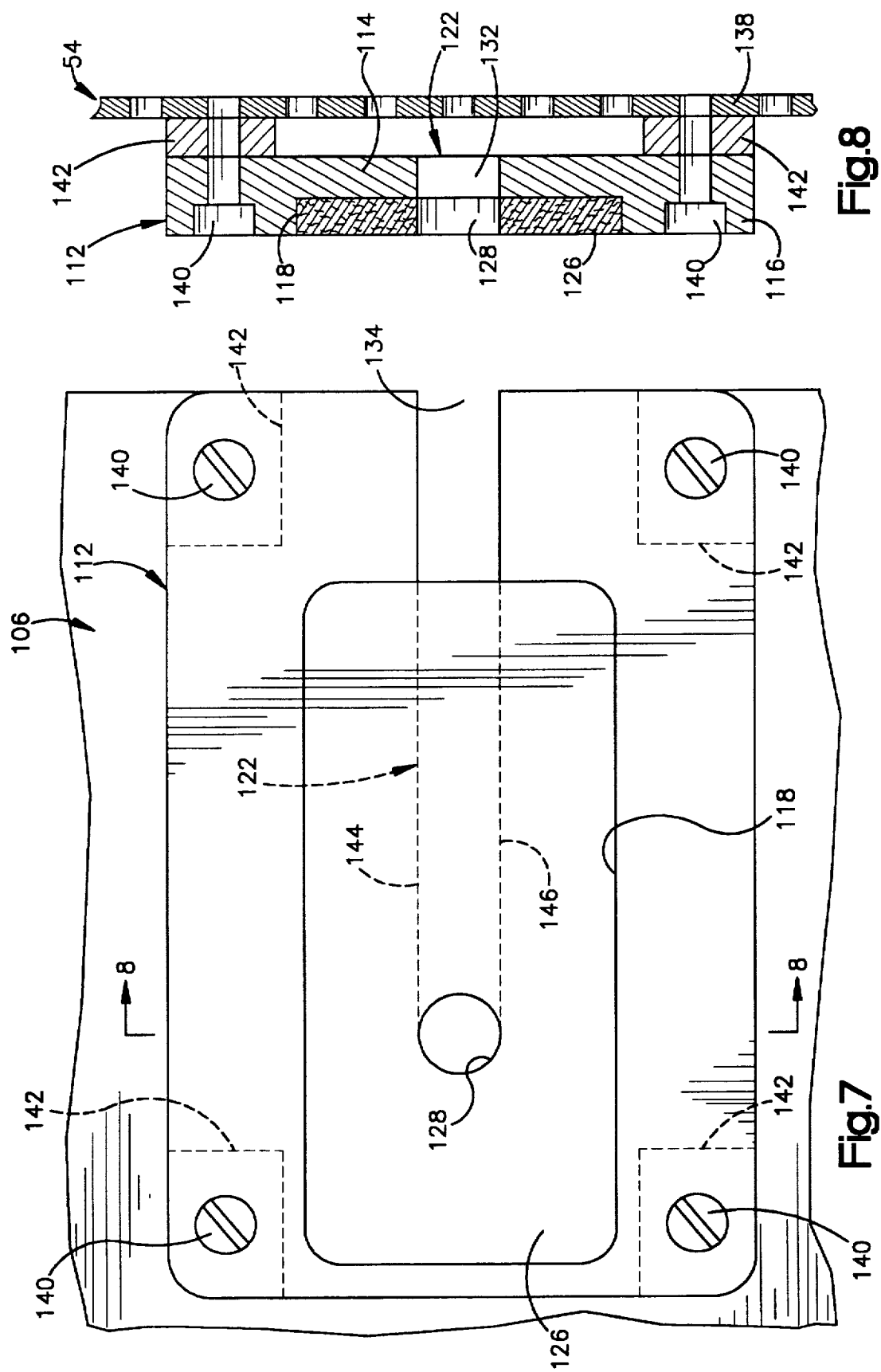

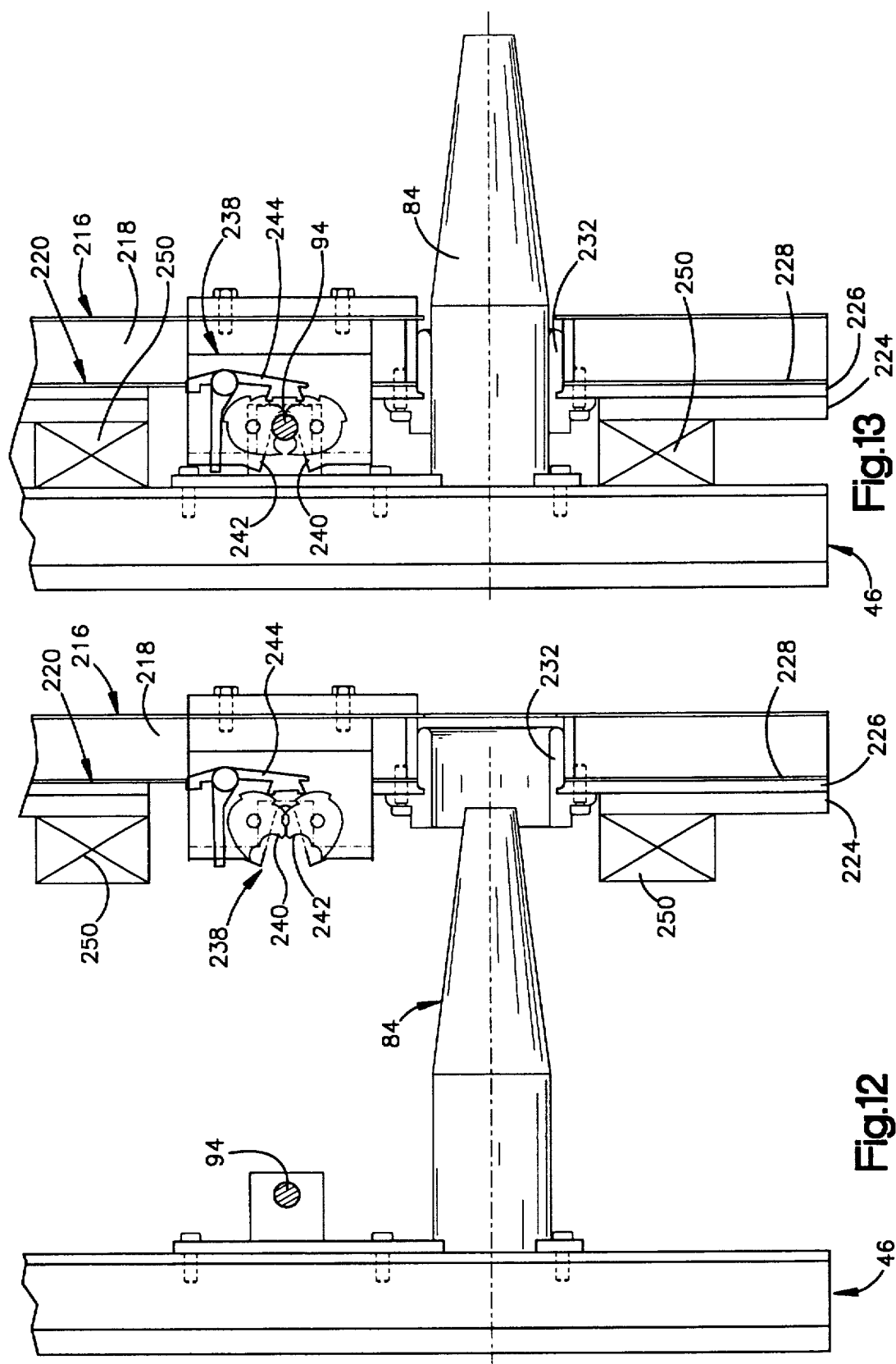

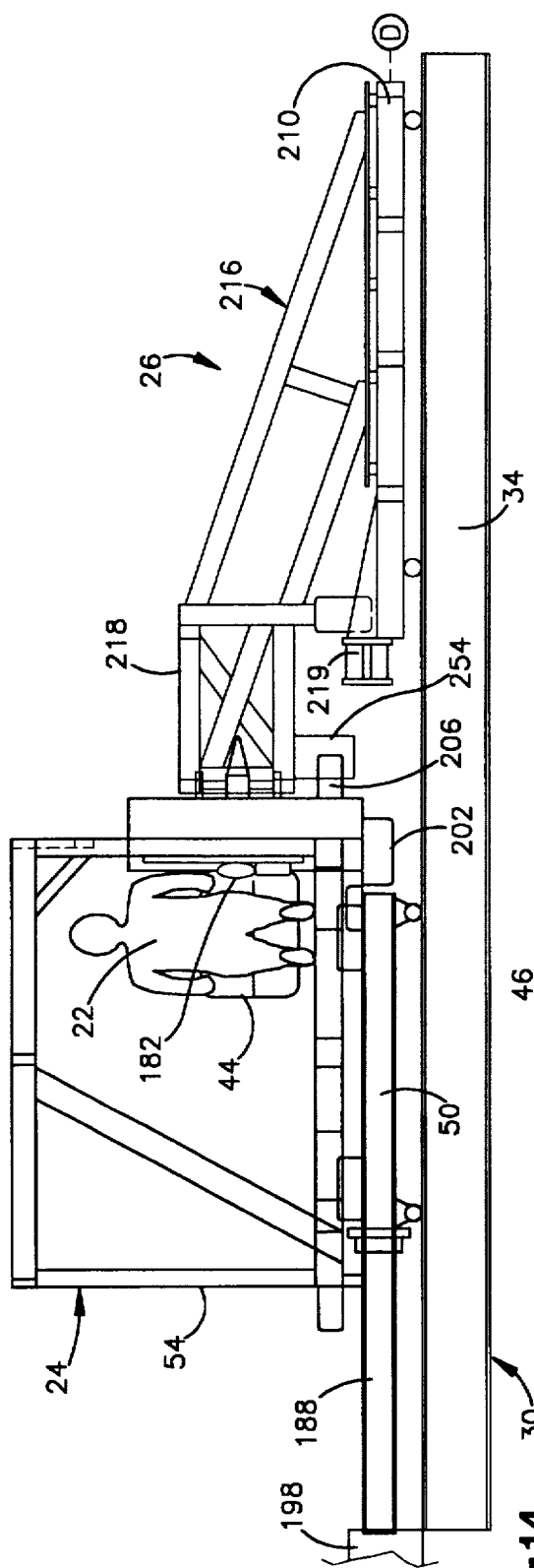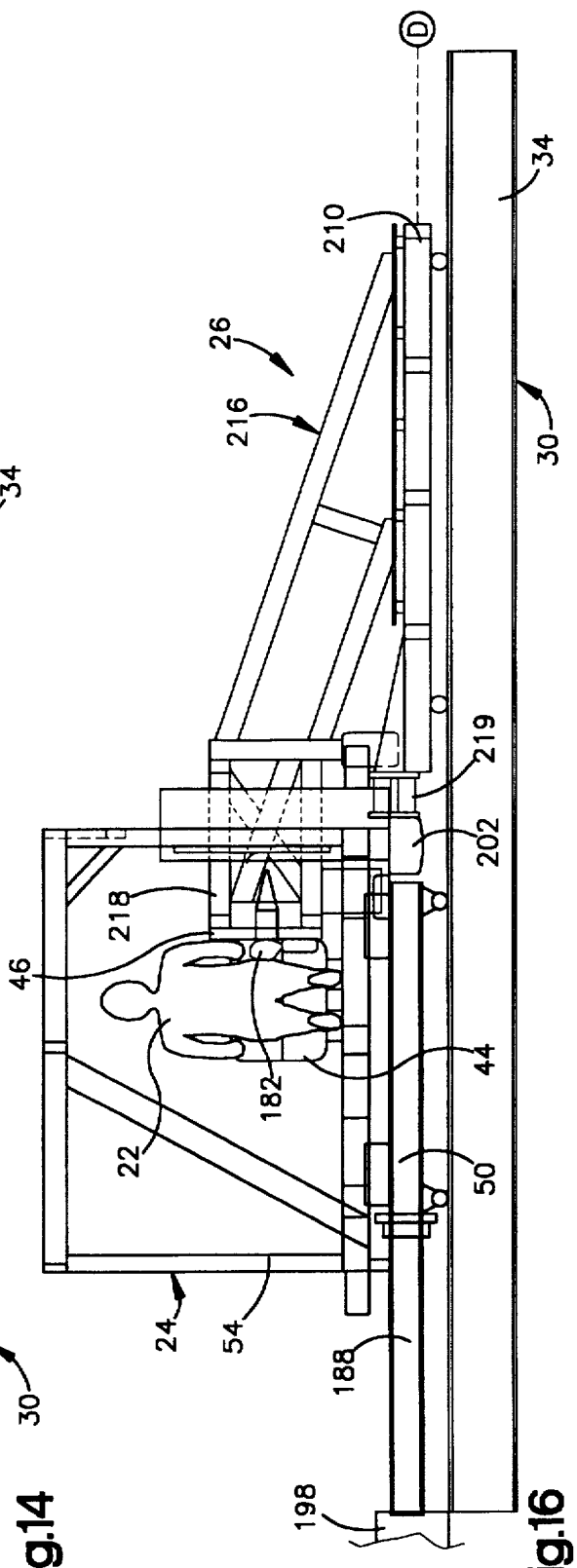

5,485,758

1

METHOD AND APPARATUS FOR SIMULATING VEHICLE SIDE IMPACTS

BACKGROUND OF THE INVENTION

The present invention relates to a method and apparatus which are used with a test dummy to simulate vehicle side impacts.

Known methods and apparatus for simulating vehicle side impacts were disclosed at the Thirteenth International Technical Conference on Experimental Safety Vehicles in Paris, France on Nov. 4–7, 1991. Among the various methods and apparatus disclosed at this Conference was one in which a test dummy is mounted on a seat disposed on a target sled. A door structure is mounted on a bullet sled and, together with the bullet sled, is moved toward the seat. Thus, the space between the door structure and the seat changes as the door structure is moved toward the target sled by the bullet sled upon which the door structure is mounted. In a side impact, the door structure of the vehicle remains at a fixed distance from the seat until it is struck by another vehicle or the like. This makes it extremely difficult to use the known method and apparatus for testing an air bag or other vehicle safety apparatus which is intended to protect a vehicle occupant in the event of a side impact against the vehicle, particularly if the air bag is to be mounted on the door structure. Also, the known method and apparatus is not particularly satisfactory for testing an air bag or other vehicle safety apparatus to protect an out of position occupant with a controlled space between the door and the occupant.

SUMMARY OF THE INVENTION

The present invention provides a new and improved method and apparatus for use with a test dummy to simulate vehicle side impacts. The apparatus includes a door structure which simulates a vehicle door. A seat is disposed adjacent to an inner side of the door structure to support the test dummy in a desired spatial relationship with the door structure.

A sled impacts against the outer side of the door structure to move the door structure relative to the seat. Upon impacting of the sled with the door structure, a connector assembly connects the door structure with the sled. An air bag may be inflated between the door structure and the test dummy upon engagement of the sled with the door structure.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a simplified side elevational view of an apparatus constructed in accordance with the present invention to simulate vehicle side impacts;

FIG. 2 is a simplified plan view, taken generally along the line 2—2 of FIG. 1;

FIG. 3 is an end view, taken generally along the line 3—3 of FIG. 2;

FIG. 4 is a view generally similar to FIG. 3 and taken along the line 4—4 of FIG. 2;

FIG. 5 is a perspective view of a door structure used with the apparatus of FIGS. 1–4;

2

Figure 9:
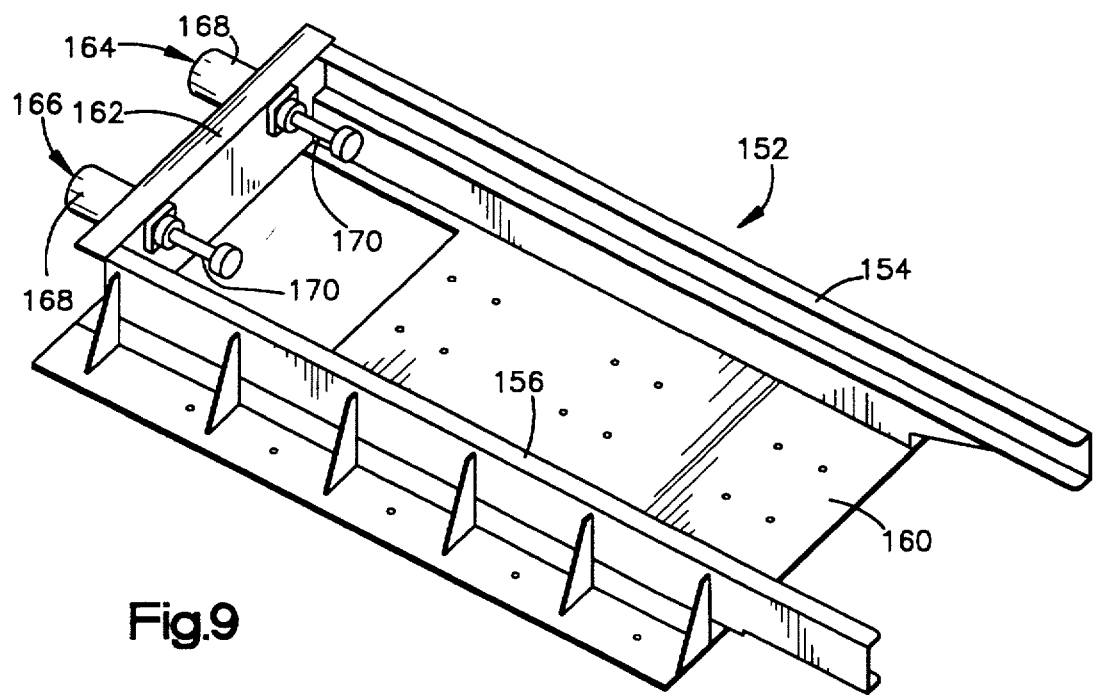
Figures 10, 11:
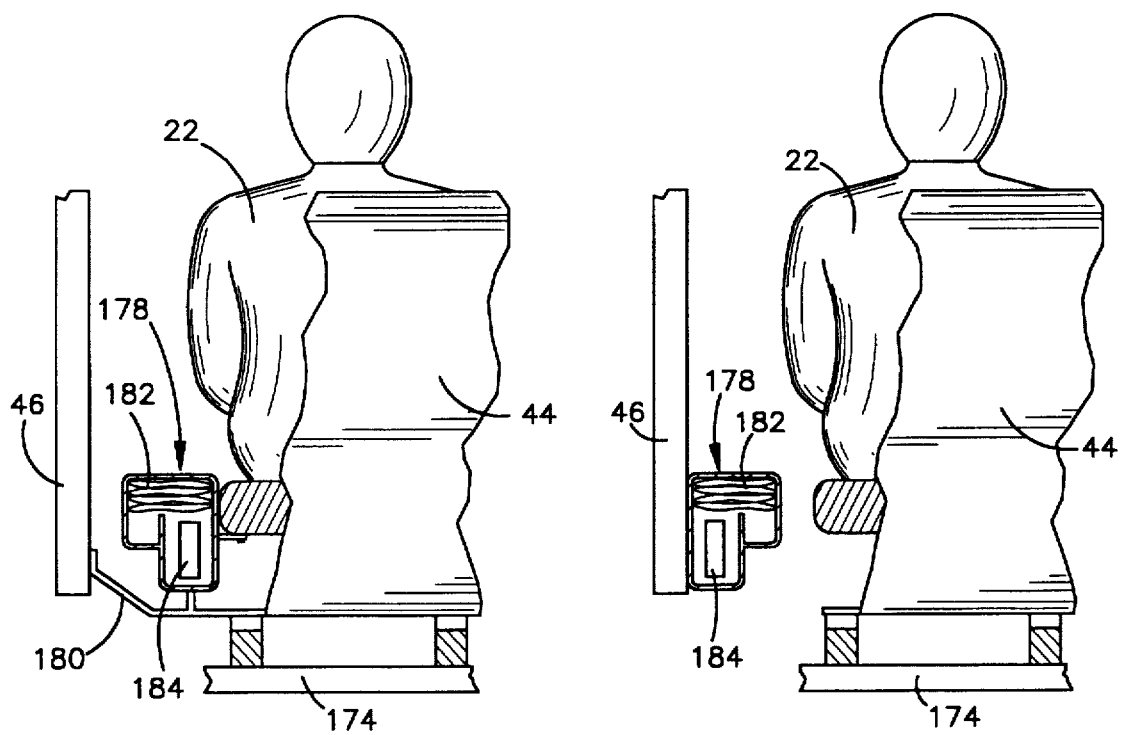
Figure 15:
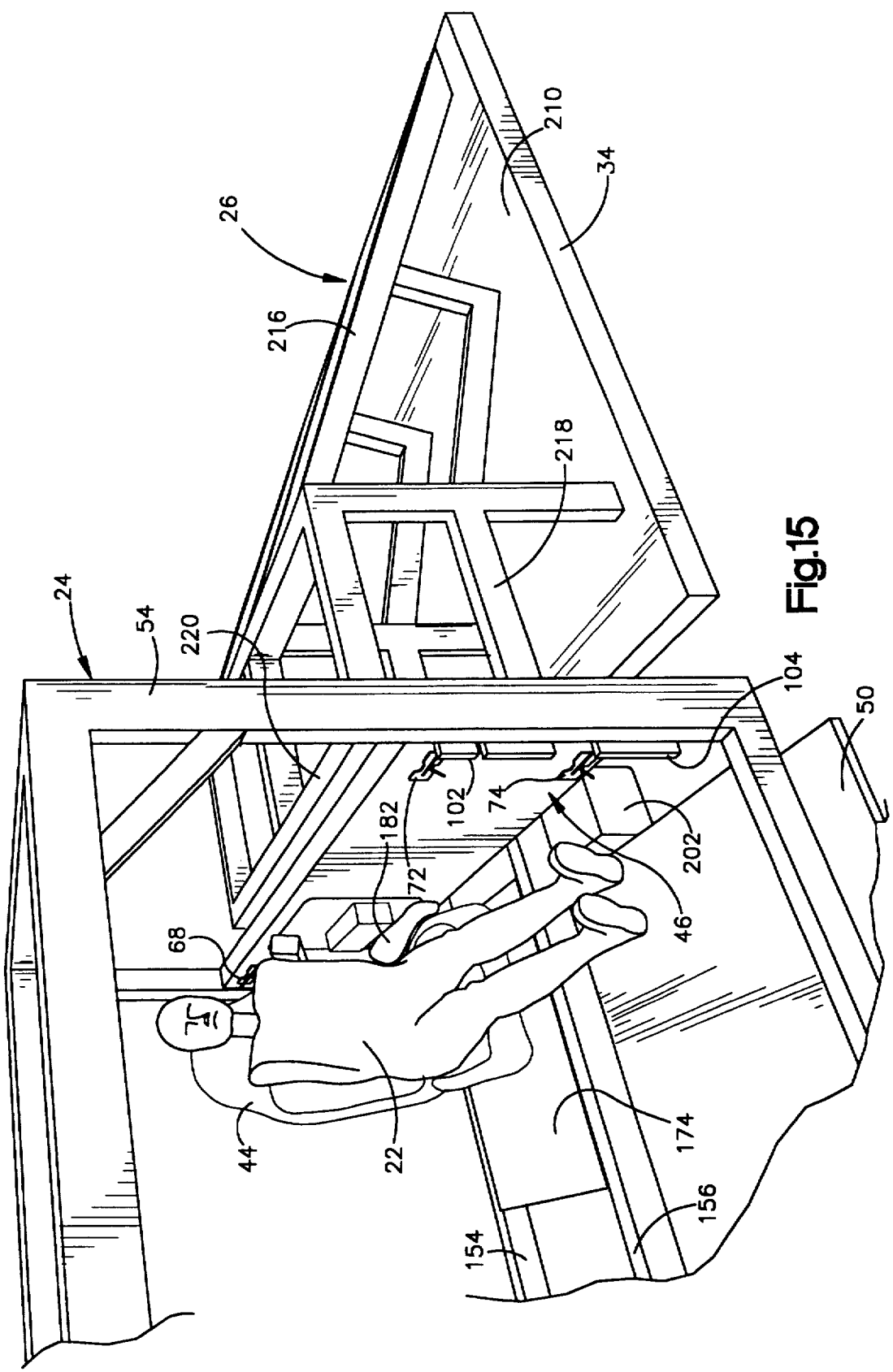

FIG. 6 is a perspective view of the door structure of FIG. 5 but looking at the door structure of FIG. 5 in a different direction;

FIG. 7 is a plan view of a door structure support assembly;

FIG. 8 is a sectional view, taken generally along the line 8—8 of FIG. 7;

FIG. 9 is a pictorial illustration of a seat track assembly used in the apparatus of FIGS. 1 and 2;

FIG. 10 is a schematic illustration depicting the manner in which a stored air bag is mounted on a seat of the apparatus of FIG. 1;

FIG. 11 is a schematic illustration, generally similar to FIG. 10, illustrating an alternative arrangement in which the air bag is mounted on the door structure;

FIG. 12 is an enlarged fragmentary sectional view of a portion of the apparatus of FIG. 1;

FIG. 13 is a fragmentary sectional view, generally similar to FIG. 12, further illustrating the construction of the apparatus;

FIG. 14 is a side elevational view, generally similar to FIG. 1, depicting the manner in which a bullet sled engages the door structure with the door structure mounted on a target sled;

FIG. 15 is a pictorial illustration depicting the relationship between the bullet sled, door structure, seat and a test dummy upon impact of the bullet sled against the door structure; and FIG. 16 is a side elevational view illustrating the manner in which the bullet sled moves the door structure and seat relative to the target sled.

DESCRIPTION OF AN EMBODIMENT OF THE INVENTION

An apparatus 20 for simulating vehicle side impacts is illustrated in FIGS. 1–4. The apparatus 20 is used with a test dummy 22. The apparatus 20 includes a target sled 24 and a bullet sled 26.

The target sled 24 and bullet sled 26 are both movable along a main track 30. The main track 30 includes a pair of parallel rails 32 and 34. A drive assembly, indicated schematically at 38 in FIG. 1, is operable to move the bullet sled 26 along the main track 30 into engagement with the target sled 24. The drive assembly 38 is then effective to move the target sled 24 and bullet sled 26 together along the main track 30.

It is contemplated that the drive assembly 38 may have many different known constructions. However, in the illustrated embodiment of the invention, the drive assembly 38 includes a motor which moves the bullet sled 26 toward the right (as viewed in FIG. 1) along the main track 30 against the influence of a relatively strong elastic bungee cord 40. Although only a single bungee cord 40 has been shown in FIGS. 1 and 2 as being connected with the bullet sled 26, it is contemplated that a plurality of bungee cords will be connected with the bullet sled. As the drive assembly 38 moves the bullet sled 26 rightward along the main track 30 to the initial position shown in FIGS. 1 and 2, the bungee cord 40 is stretched. Upon releasing of the bullet sled 26, the bungee cord 40 drives the bullet sled toward the target sled 24.

The test dummy 22 is mounted on a seat 44 disposed on the target sled 24. The seat 44 is disposed adjacent to a door structure 46 which is also mounted on the target sled 24. The door structure 46 simulates a vehicle door. The door structure 46 is engageable by the bullet sled 26 as the bullet sled is moved by the bungee cord 40.

The target sled 24 includes a rectangular base 50 (FIG. 1). The rectangular base 50 is supported on the main track 30 by a plurality of rollers 52. The door structure 46 is mounted on a frame 54 which is connected with the base 50.

The door structure 46 (FIGS. 5 and 6) includes a core (not shown) formed of aluminum tubing having a rectangular cross sectional configuration. A sheet of plywood (FIG. 5) forms an inner side 58 of the door structure. A sheet of aluminum (FIG. 6) forms an outer side 60 of the door structure 46. The outer side 60 of the door structure 46 extends parallel to the inner side 58 of the door structure.

The door structure 46 is mounted on the frame 54 with the inner side 58 facing toward the test dummy 22 and seat 44. The door structure 46 is relatively light and has a weight of approximately 100 pounds. A pair of handling straps 62 and 64 (FIGS. 5 and 6) extend upwardly from the door structure 46 to facilitate handling of the door structure. If desired, the door structure 46 could be a door of a vehicle. The vehicle door may be mounted directly on the frame 54 in the same manner as the door structure 46 or may be mounted on the inner side of the door structure 46.

The door structure 46 is provided with a plurality of latch assemblies 68, 70, 72 and 74 (FIG. 5) which are mounted on the inner side 58 of the door structure adjacent to the four corners of the door structure. The latch assemblies 68–74 have the same construction. Each latch assembly 68–74 includes a latch bolt 76 which is slidable relative to a retainer 78. Each of the latch bolts 76 is movable between a retracted position in which the latch bolt does not extend outward from the door structure and an extended position (shown in FIG. 5) in which the latch bolt extends outward from the door structure.

A pair of alignment pins or projections 82 and 84 (FIG. 6) are mounted on the outer side 60 of the door structure 46. Each of the alignment pins 82 and 84 has a cylindrical main section 86 and an axially tapered end section 88. The alignment pins 82 and 84 project outward from the outer side 60 of the door structure 46 and have parallel central axes which extend perpendicular to the outer side of the door structure.

A pair of parallel cylindrical latch bars 92 and 94 are mounted on the outer side 60 of the door structure 46. The latch bars 92 and 94 have central axes which extend parallel to the outer side 60 of the door structure 46. When the door structure 46 is mounted on the frame 54, the central axes of the latch bars 92 and 94 are vertical (FIG. 4). The latch bars 92 and 94 are secured to the inner side 60 of the door structure 46 by mounting brackets 98 (FIG. 6).

Door support assemblies 102, 104, 106, and 108 (FIG. 4) are connected with the frame 54. The door support assemblies 102, 104, 106, and 108 are engaged by the latch assemblies 68, 70, 72, and 74 (FIG. 5) to support the door structure 46 on the frame 54 with the inner and outer sides 58 (FIG. 5) and 60 (FIG. 6) of the door structure in parallel vertical planes. The extended latch bolt 76 in the latch assembly 68 (FIG. 5) engages the door support assembly 102 (FIG. 4). Similarly, the extended latch bolts 76 in the latch assemblies 70, 72 and 74 engage the door support assemblies 104, 106 and 108 respectively.

The door support assembly 106 (FIG. 7) includes a rigid metal retainer frame 112. The rigid metal retainer frame 112 is formed as one piece and includes a flat base 114 (FIG. 8). A rectangular rim 116 projects from the base 114 and cooperates with the base to define a rectangular recess 118. A horizontal linear slot 122 (FIGS. 7 and 8) is formed in the base 114 and extends through the rim 116.

A generally rectangular body 126 of cardboard is disposed in the recess 118. The body 126 of cardboard has a circular opening 128 which is offset to the left (as viewed in FIG. 7) of the center of the body 126 of cardboard. The circular opening 128 is aligned with a closed end portion 132 (FIG. 8) of the slot 122. An open end portion 134 of the linear slot 122 is formed in the rim 116.

The retainer frame 112 is mounted on a plate 138 (FIG. 8) which forms part of the frame 54. The retainer frame 112 is connected with the plate 138 by suitable fasteners 140 (FIG. 7). Spacer blocks 142 maintain the retainer frame 112 in a spaced apart relationship with the plate 138 (FIG. 8). The retainer frame 112 is mounted such that opposite linear sides 144 and 146 (FIG. 7) of the slot 122 are horizontal. The open end 134 of the slot 122 is disposed adjacent to the seat 44.

Although only the door support assembly 106 has been shown in FIGS. 7 and 8, it should be understood that the door support assemblies 102, 104 and 108 have the same construction as the door support assembly 106. The open ends of the horizontal slots 122 in the support assemblies 102, 104 and 108 are disposed adjacent to the inner side 58 of the door structure 46 and the seat 44. When the door structure 46 is mounted on the frame 54, as shown in FIG. 4, the latch bolts 76 in the latch assemblies 68, 70, 72 and 74 are received in the circular openings 128 in the bodies 126 of cardboard and are received in the slots 122 in the door support assemblies 102, 104, 106 and 108, respectively. Although it is preferred to mount bodies 126 of cardboard in the recesses 118 in the door support assemblies 102–108, it is contemplated that bodies of other material could be mounted in the recesses if desired.

A seat track assembly 152 (FIGS. 2 and 9) is connected to the base 50 (FIG. 2) of the target sled 24. The seat track assembly 152 includes a pair of parallel rails 154 and 156. The rails 154 and 156 of the seat track assembly 152 extend parallel to the rails 32 and 34 of the main track 30 (FIG. 2).

The rails 154 and 156 of the seat track assembly 152 are connected to a flat base plate 160 (FIG. 9). The base plate 160 is secured to the base 50 of the target sled 24 (FIG. 2). An end wall 162 extends horizontally between the rails 154 and 156 and perpendicular to the rails. The end wall 162 also extends vertically perpendicular to the base plate 160. A pair of shock absorber assemblies 164 and 166 are mounted on the end wall 162. Each of the shock absorber assemblies 164 and 166 includes a cylinder 168 which is fixedly connected to the end wall 162. The shock absorber assemblies 164 and 166 also include piston rods 170 which extend from the end wall 162 in a direction parallel to the rails 1.54 and 156.

A carriage 174 (FIG. 2) is movable along the rails 154 and 156 of the seat track assembly 152. The carriage 174 is connected with the rails 154 and 156 by rollers (not shown) at the four corners of the generally rectangular carriage. The rails 154 and 156 guide movement of the carriage 174 along a path which is aligned with the rails 32 and 34 of the main track 30. Thus, the carriage 174 is movable along the seat track assembly 152 relative to the target sled 24. The target sled 24 is, itself, movable along the rails 32 and 34 of the main track 30.

The carriage 174 is initially secured to the rails 154 and 156 by shear pins. When a predetermined force is applied against the carriage 174, the shear pins are broken and the carriage 174 moves relative to the target sled 24 along the rails 154 and 156. Alternatively, if desired, friction clamps could be used to secure the carriage 174 to the rails 154 and 156.

The seat 44 is secured to the carriage 174 by suitable bolts. The seat 44 can be located at any one of many positions relative to the carriage 174 to enable the position of the seat 44 to be adjusted relative to the door structure 46. This enables the seat 44 and test dummy 22 to be located at a desired distance and/or angle from the door structure 46. A netting 176 (FIGS. 3 and 4) is connected with the left, (as viewed in FIG. 1) end of the frame 54.

A safety apparatus 178 (FIGS. 2 and 10) is secured to the seat 44. Since the position of the seat 44 relative to the carriage 174 can be varied, the safety apparatus 178 can be located at a desired distance from the door structure 46.

The specific safety apparatus 178 illustrated in FIG. 10 includes an air bag 182 and an inflator assembly 184 which contains a source of fluid for inflating the air bag. The inflator assembly ].84 is mounted on a lower portion of the frame of the seat 44 by suitable bolts. It is contemplated that safety apparatus having many different constructions will be tested with the apparatus 20 which simulates vehicle side impacts.

Since the inflator assembly 184 is mounted on the lower portion of the seat 44, the inflator assembly can be accurately positioned relative to the test dummy 22 on the seat 44 and the door structure 46. Although the inflator assembly 184 could have many different constructions, it is contemplated that the inflator assembly may be constructed in a manner similar to that disclosed in U.S. Pat. Nos. 4,902,036 and 4,907,819. The manner in which the safety apparatus 178 is connected with the seat 44 is the same as is disclosed in U.S. Pat. No. 5,251,931.

In the embodiment of the invention illustrated in FIG. 11, the safety apparatus 178 is mounted on the door structure 46. If desired, the safety apparatus 178 could be mounted on the carriage 174 adjacent to both the door structure 46 and the seat 44. Since the seat 44 is secured to the carriage 174 and since the carriage 174 and the door structure 46 are connected with the base 50 of the target sled 24, the space between the seat 44 and the door structure 46 remains constant prior to impact of the bullet sled 26 with the door structure. This facilitates evaluation of the safety apparatus 178 and allows the test dummy 22 to be located in any desired position relative to the seat 44 and door structure 46 prior to impact.

A rod or probe 188 (FIG. 2) is fixedly secured to the base 50 of the target sled 24. The rod 188 extends into engagement with an energy absorber 198. The energy absorber 198 has a known construction and resists movement of the rod 188 and target sled 24 toward the left. As the target sled 24 and rod 188 are moved toward the left (as viewed in FIG. 2), the energy absorber 198 absorbs energy transmitted from the target sled 24 through the rod 188 to the energy absorber 198.

A body 202 (FIG. 1) of energy absorbing material is mounted on the base 50 of the target sled 24 immediately below the door structure 46. The body 202 of energy absorbing material extends below the door structure for a distance which is approximately equal to the distance between the rails 32 and 34 of the main track 30. The body 202 of energy absorbing material is crushable to absorb energy. As an alternative to the energy absorbing material a suitable shock absorber structure could be used.

A sensor 206 is mounted on the target sled 24. The sensor 206 cooperating with flag 254 may be of either the photo electric type or the contact type. The sensor 206 detects when the bullet sled 26 is in a predetermined position relative to the target sled 24 and door structure 46. If desired, the sensor could be of the inertia type which responds to impacts against the door structure 46.

The bullet sled 26 (FIGS. 1, 2 and 3) includes a base 210 which is connected with the rails 32 and 34 of the main track 30 by rollers 212. The rollers 212 guide movement of the bullet sled 26 along the main track 30.

The drive assembly 38 and bungee cord 40 are connected with the base 210 of the bullet sled 26. It should be understood that a drive assembly having a different construction could be used. For example, an explosive, pneumatic or electric drive assembly could be used to accelerate the bullet sled 26 toward the target sled 24.

A rigid frame 216 is connected to the base 210 of the bullet sled 26. The frame 216 includes an overhang portion 218 which extends outwardly from the base 210 toward the target sled 24 (FIGS. 1 and 2). A bumper 219 is disposed beneath the overhang portion 218 and is aligned with the body 202 (FIG. 1) of energy absorbing material.

The overhang portion 218 includes a rectangular impact wall 220. The impact wall 220 is parallel to the door structure 46 on the target sled 24. Although the impact wall 220 could have may different constructions, in the illustrated embodiment of the invention, the impact wall 220 includes a layer 224 of plywood (FIGS. 12 and 13). The layer 224 of plywood is a shock absorbing material and faces toward the door structure 46. A plate 226 of steel is disposed immediately behind the layer 224 of plywood. The steel plate 226 is connected with the overhang portion 218 of the frame 216.

A cylindrical alignment bushing 232 is connected with the impact wall 220 and overhang portion 218 of the frame 216. The cylindrical alignment bushing 232 turns a recess which is horizontally aligned with the alignment pin 84 on the door structure 46. Thus, the horizontal central axis of the alignment pin 84 is coincident with the horizontal central axis of the alignment bushing 232. The coincident central axes of the alignment pin 84 and alignment bushing 232 extend parallel to the rails 32 and 34 of the main track 30 and perpendicular to the impact wall 220 and door structure 46.

A connector latch assembly 238 (FIGS. 12 and 13) is mounted on the impact wall 220. The connector assembly 238 includes a pair of jaws 240 and 242 which are engageable with the latch bar 94 upon engagement of the impact wall 220 with the door structure 46. Spring biased jaws 240 and 242 are retained in the initial position shown in FIG. 12 until the jaws engage the latch bar 94. When the jaws 240 and 242 engage the latch bar 94, the Jaws are engaged by a detent 244 and firmly grip the latch bar 94 to interconnect the door structure 46 and the impact wall 220 securely.

Although only the alignment pin 84 and alignment bushing 232 are shown in FIGS. 12 and 13, it should be understood that there is a second alignment bushing, having the same structure as the alignment bushing 232, on the impact wall 220. This second alignment bushing defines a second recess and cooperates with the alignment pin 82 in the same manner as in which the alignment bushing 232 cooperates with the alignment pin 84. In addition, a second connector assembly having the same construction as the connector assembly 238 cooperates with the latch bar 92 to interconnect the impact wall 220 and the door structure 46. Although the connector assembly 238 may have many different constructions, in the illustrated embodiment of the invention, the latch assembly was similar to a front .door latch in a 1980 Ford Motor Company pickup truck, except the cam profiles, material thicknesses, shape and the material hardness of the jaws 240, 242 and detent 244 were changed to meet the performance requirements of this higher speed application.

A plurality of bodies 250 of energy absorbing material are mounted on the impact wall 220. The bodies 250 of energy absorbing material are crushable to absorb energy and minimize any tendency for the door structure 46 and impact wall 220 to move away from each other before the latch assembly 238 has gripped the latch bar 94.

A flag or panel 254 (FIG. 1) is mounted on the overhang portion 218 of the frame 216. The flag 254 is received in an opening formed in the sensor 206 when the impact wall 220 engages the door structure 46. When the sensor 206 detects the presence of the flag 254, the sensor provides a signal which initiates operation of the inflator 184 (FIG. 10) to inflate the air bag 182.

Although it is preferred to use detecting of the flag 254 by the sensor 206 to initiate inflation of the air bag 182 by the inflator assembly 184, inflation of the air bag 182 by the inflator assembly 184 could be initiated by an inertia sensor mounted in any desired location on the target sled 24. By using the cooperation between the sensor 206 and the flag 254 to initiate inflation of the air bag 182, inflation of the air bag is initiated when the impact wall 220 is in a predetermined position relative to the door structure 46. If an inertia sensor is used to initiate inflation of the air bag 182, inflation of the air bag is initiated when a predetermined force is transmitted to the inertia sensor. The inertia sensor may have the construction disclosed in U.S. Pat. No. 5,178,264.

When the apparatus 20 is to be used to simulate a vehicle side impact, the seat 44 is positioned in a desired location on the carriage 174 (FIG. 2). The carriage 174 is secured to the rails 154 and 156 of the seat track assembly 152 by shear pins or friction clamps. This results in the seat 44 being secured in a desired location relative to the target sled 24.

The door structure 46 is mounted on the frame 54. The door structure 46 is supported on the frame 54 by the latch assemblies 68–74 (FIG. 5). At this time, the latch bolts 76 extend into the door support assemblies 102, 104, 106 and 108. Thus, the latch bolt 76 of the latch assembly 72 extends into the opening 128 (FIGS. 7 and 8) formed in the body 126 of cardboard and into the slot 122 formed in the base 114 of the retainer frame 112. A portion of the weight of the door structure is transmitted to the lower side 146 of the slot 122 by engagement of the latch bolt 76 of the latch assembly 68 with the lower side of the slot.

The safety apparatus 178 is disposed adjacent to the door structure 46 and the vehicle seat 44. If desired, the safety apparatus 178 may be connected to the vehicle seat 44 in the manner shown in FIG. 10. Alternatively, the safety apparatus 178 may be connected to the door structure 46 in the manner illustrated in FIG. 11. Further, if desired, the safety apparatus 178 could be mounted on the carriage 174 adjacent to the door structure 46 and seat 44.

A section of sheet metal 180 attached to the base of the seat 44 is formed to a shape to simulate a vehicle floor pan profile. As simulated in a side impact crash, this floor pan acts to guide the seat mounted air bag above the door bottom and crushes into the seat base.

The test dummy 22 is then positioned on the seat 44. Although it is believed that it will be preferred to use seat belts to connect the test dummy 22 with the seat 44 in a known manner, the use of seat belts may be omitted if desired. By having the door structure 46, safety apparatus 178 and seat 44 on the target sled 24, the test dummy 22 can be readily mounted in any desired position relative to the door structure, safety apparatus and seat.

The drive assembly 38 is operated to move the bullet sled 26 to the initial position shown in FIGS. 1 and 2. Movement of the bullet sled 26 to the initial position shown in FIGS. 1 and 2 elastically stretches the bungee cord 40.

The drive assembly 38 is then operated to release the bullet sled 26 for movement toward the target sled 24 under the influence of the bungee cord 40. As the bungee cord 40 moves the bullet sled 26 along the main track 30 toward the stationary target sled 24, the alignment pins 82 and 84 move into alignment bushings 232 on the impact wall 220 of the bullet sled 26. If the impact wall 220 is slightly misaligned with the door structure 46, the cooperation between the alignment pins 82 and 84 and alignment bushings 232 will align the impact wall 220 with the door structure 46.

As the bullet sled 26 continues to move toward the door structure 46 on the target sled 24, the bodies 250 of energy absorbing material on the impact .wall 220 move into engagement with the door structure 46 (FIG. 13). As the bodies 250 of energy absorbing material engage the door structure 46 (FIGS. 13 and 14), the connector assemblies 238 on the impact wall 220 engage the latch bars 92 and 94 (FIG. 6) on the door structure 46. This results in the door structure 46 and the impact wall 220 being interconnected by the connector assemblies 238 and the latch bars 92 and 94.

As the connect,or assemblies 238 are being actuated to grip the latch bars 92 and 94 on the door structure 46, the force applied against the door structure by the impact wall 220 moves the door structure relative to the door support assemblies 102–108. As this occurs, the latch bolts 76 in the latch assemblies 68–74 tear the bodies 126 of cardboard and move along the slots 122 in the retainer frames 112 of the door support assemblies 102–108. The door structure 46 is moved relative to the door support assemblies 102–108 under the influence of force transmitted from the impact wall 220 of the bullet sled 26 to the door structure.

When the impact wall 220 initially engages the door structure 46, there is a tendency for the door structure to rebound or move away from the impact wall. Any tendency for the door structure 46 to rebound is eliminated by the combined effects of the bodies 250 of energy absorbing material on the impact wall 220 and the bodies 126 of cardboard in the door support assemblies 102–108. Thus, the bodies 250 of energy absorbing material are crushed and absorb energy as the impact wall 220 moves into engagement with the door structure 46. In addition, the resistance provided by the bodies 126 of cardboard to tearing by the latch bolts 76 resists movement of the door structure 46 away from the impact wall 220.

As the bodies 250 of energy absorbing material on the impact wall 220 move into engagement with the door structure 46 (FIG. 13), the flag 254 on the bullet sled 26 is detected by the sensor assembly 206 on the target sled 24 (FIG. 14). When this occurs, a control signal is transmitted from the sensor assembly 206 to effect operation of the inflator assembly 184 to initiate inflation of the air bag 182 (FIG. 15). A flow of fluid from the inflator assembly 184 inflates the air bag 182 so that a portion of the air bag is disposed between the seat 44 and door structure 46 and another portion of the air bag is disposed between the test dummy 22 and the door structure.

The inflated air bag 182 protects the test dummy 22 from the full force applied by the bullet sled 26 against the door structure 46. However, force is transmitted from the bullet sled 26 through the door structure 46 and air bag 182 to the seat 44. The force applied against the seat 44 tends to cause the seat to move relative to the test dummy.

After the door structure 46 has been connected with the impact wall 220 of the bullet sled 26, the bullet sled continues to move forward from the position shown in FIG. 14 toward the position shown in FIG. 16. As this occurs, the latch bolts 76 move out of the slots 122 in the support assemblies 102, 104, 106 and 108. When this occurs, the door structure 46 and impact wall 220 are interconnected and move as a unit relative to the target sled 24.

The force transmitted to the seat 44 from the door structure 46 and bullet sled 26 severs the shear pins which hold the carriage 174 against movement along the rails 154 and 156. Therefore, the carriage 174 and seat 44 move along the rails 154 and 156 with the impact wall 220 of the bullet sled 26 and the door structure 46. At this time, the target sled 24 is stationary on the main track 30.

Since the rails 154 and 156 of the seat track assembly 152 extend parallel to the rails 32 and 34 of the main track 30, the path of movement of the carriage 174 and seat 44 is aligned with the path of movement of the bullet sled 26. After the seat 44 has been moved through a predetermined distance relative to the target sled 24, the bumper 219 on the bullet sled 26 moves into engagement with the body 202 of crushable material on the stationary target sled 24 (FIG. 16). At this time, the overhang portion 218 of the frame 216 of the bullet sled 26 will have moved the door structure 46 through a predetermined distance relative to the target sled 24. In one specific embodiment of the invention, when the bumper engages the body 202 of energy absorbing material, the impact wall 220 will have moved the door structure 46 through approximately 24 inches relative to the rails 154 and 156 of the seat track assembly 152.

Prior to engagement of the bumper 219 on the bullet sled 26 with the body 202 of energy absorbing material, the target sled 24 remains stationary on the main track 30. Thus, the energy absorber 198 has sufficient resistance to withstand forces transmitted from the bullet sled 26 through the door structure 46 to the target sled 24.

Crushing of the body 202 of energy absorbing material by the bumper 219 on the bullet sled 26 results in the overhang portion 218 of the bullet sled frame 216 moving through an additional distance into the target sled 24. As this occurs, the target sled 24 moves leftwardly (as viewed in FIG. 16) along the main track 30. This movement of the target sled 24 is resisted by engagement of the probe or rod 188 with the energy absorber 198.

When the body 202 of energy absorbing material has been completely crushed, the door structure 46 will have moved the carriage 174 to a position in which the carriage engages the shock absorbers 164 and 166. Continued movement of the bullet sled 26 and target sled 24 together results in the absorption of energy by the energy absorber 198. At the same time, the shock absorbers 164 and 166 arrest movement of the seat carriage 174 and seat 44 relative to the tracks 154 and 156. In one specific embodiment of the invention, the door structure 46 moved through eight inches as the body 202 of energy absorbing material was crushed by the bumper 219.

It is contemplated that during certain impacts with certain types of safety apparatus, the test dummy may be subjected to severe forces which will cause parts of the test dummy and/or seat 44 to move into engagement with the netting 176 on the left (as viewed in the drawings) wall of the frame 54. The netting 176 on the frame 54 absorbs impact forces and restrains movement of members which engage the netting.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use with a test dummy to simulate vehicle side impacts, said apparatus comprising:

a door structure for simulating a vehicle door;

a seat disposed adjacent to an inner side of said door structure for supporting the test dummy in a desired relationship with said door structure;

sled means for impacting against an outer side of said door structure to move said door structure relative to said seat; and connector means for connecting said door structure with said sled means upon impacting of said sled means against said door structure.

2. An apparatus as set forth in claim 1 further including track means for guiding movement of said seat under the influence of force transmitted from said sled means through said door structure to said seat.

3. An apparatus as set forth in claim 1 further including alignment means connected with said door structure and said sled means for aligning said door structure and said sled means prior to impacting of said sled means against the outer side of said door structure.

4. An apparatus as set forth in claim 1 further including energy absorbing means for retarding movement of said door structure relative to said sled means upon impacting of said sled means against said door structure.

5. An apparatus as set forth in claim 1 further including first guide means for guiding movement of said sled means along a first path extending transversely to the outer side of said door structure and second guide means for guiding movement of said seat along a path which is parallel with said first path.

6. An apparatus as set forth in claim 1 further including support means for supporting said seat and said door structure, said support means including first guide means for guiding movement of said seat relative to said support means under the influence of force transmitted from said sled means through said door structure to said seat, and second guide means for guiding movement of said support means under the influence of force transmitted from said sled means to said support means.

7. An apparatus as set forth in claim 1 further including energy absorbing means disposed between said sled means and said door structure for absorbing energy upon impacting of said sled means against said door structure.

8. An apparatus as set forth in claim 7 further including alignment means connected with said door structure and said sled means for aligning said door structure and said sled means prior to absorption of energy by said energy absorbing means.

9. An apparatus as set forth in claim 1 further including means for supporting an air bag adjacent to said door structure and the test dummy.

10. An apparatus as set forth in claim 9 further including means for effecting inflation of said air bag from a folded condition to an expanded condition between said door structure and the test dummy upon impacting of said sled means against said door structure.

11. An apparatus for use with a test dummy to simulate vehicle side impacts, said apparatus comprising:

a door structure for simulating a vehicle door;

a seat disposed adjacent to an inner side of said door structure for supporting the test dummy in a desired spatial relationship with said door structure;

sled means for impacting against an outer side of said door structure to move said door structure relative to said seat;

means for guiding movement of said sled means along a first path extending transversely to the outer side of said door structure; and means for guiding movement of said seat along a second path which is parallel with the first path.

12. An apparatus as set forth in claim 11 further including drive means for moving said sled means towards said door structure along the first path while said door structure is stationary and for moving said sled means and door structure together along the first path after impacting of said sled means against the outer side surface of said door structure.

13. An apparatus as set forth in claim 11 further including alignment means connected with said door structure and said sled means for aligning said door structure and said sled means prior to impacting of said sled means against said door structure, said alignment means including a plurality of projections extending outwardly from said door structure and a plurality of surface means connected with said sled means for defining a plurality of recesses which at least partially receive said projections prior to impacting of said sled means against said door structure.

14. An apparatus as set forth in claim 11 wherein said seat is movable along the second path under the influence of force transmitted from said door structure to said seat during movement of said sled means along the first path.

15. An apparatus as set forth in claim 11 further including means for supporting an air bag adjacent to said door structure.

16. An apparatus as set forth in claim 11 further including support means for supporting said seat and said door structure during movement of said sled means along the first path, said support means being movable along said first path with said sled means after impacting of said sled means against the outer side of said door structure.

17. An apparatus as set forth in claim 11 wherein said means for guiding movement of said sled means along a first path includes a first track which is engaged by said sled means, said means for guiding movement of said seat along a second path includes a second track which extends parallel to said first track.

18. A method of simulating a vehicle side impact, said method comprising the steps of:

positioning a test dummy on a seat in a selected relationship with a door structure;

moving a sled toward the door structure with the test dummy disposed on the seat in the selected relationship with the door structure;

impacting the sled against the door structure; and interconnecting the sled and the door structure.

19. A method as set forth in claim 18 further including the step of moving the sled and door structure together after performing said step of interconnecting the door structure and the sled.

20. A method as set forth in claim 18 further including the step of inflating an air bag adjacent to the door structure.

21. A method as set forth in claim 18 further including the steps of resisting movement of the door structure with a plurality of bodies of material and tearing the bodies of material to release the door structure for movement with the sled.

22. An apparatus for use with a test dummy to simulate vehicle side impacts, said apparatus comprising:

a door structure for simulating a vehicle door;

a seat disposed adjacent to an inner side of said door structure for supporting the test dummy in a desired relationship with said door structure;

sled means for impacting against an outer side of said door structure to move said door structure relative to said seat;

means for supporting a vehicle occupant restraint adjacent to said door structure and said seat, said vehicle occupant restraint comprises an air bag and means for effecting inflation of said air bag from a folded condition to an expanded condition upon impacting of said sled means against said door structure; and connector means for connecting said door structure with said sled means upon impacting of said sled means against said door structure.

23. An apparatus as set forth in claim 22 wherein said means for effecting inflation of said air bag includes detector means for detecting when said sled means is in a predetermined position relative to said door structure and for initiating inflation of said air bag in response to said detector means detecting that said sled means is in the predetermined position relative to said door structure.

24. An apparatus as set forth in claim 22 wherein said means for effecting inflation of said air bag includes a source of inflation fluid connected with said door structure.

25. An apparatus as set forth in claim 22 wherein said means for effecting inflation of said air bag includes a source of inflation fluid connected with said seat.

26. An apparatus as set forth in claim 22 wherein said means for effecting inflation of said air bag includes detector means for detecting when said sled means impacts against the outer side of said door structure and for initiating inflation of said air bag in response to said detector means detecting an impact of said sled means against the outer side of said door structure.

27. An apparatus as set forth in claim 22 further including alignment means connected with said door structure and said sled means for aligning said door structure and said sled means prior to impacting of said sled means against said door structure.

28. An apparatus as set forth in claim 22 further including means for guiding movement of said sled means along a first path extending transversely to the outer side of said door structure, and means for guiding movement of said seat along a second path which is parallel with the first path.

29. An apparatus as set forth in claim 22 further including means for moving said sled means toward said door structure from a position in which said sled means is spaced from the outer side of said door structure to a position in which said sled means is in engagement with the outer side of said door structure.

30. An apparatus as set forth in claim 29 wherein said means for supporting an air bag adjacent to said door structure and said seat maintains the relationship of the air bag to said door structure constant during movement of said sled means toward said door structure.

31. An apparatus for use with a test dummy to simulate vehicle side impacts, said apparatus comprising:

a door structure for simulating a vehicle door;

a seat disposed adjacent to an inner side of said door structure for supporting the test dummy in a desired spatial relationship with said door structure;

sled means for impacting against an outer side of said door structure to move said door structure relative to said seat;

means for guiding movement of said sled means along a first path extending transversely to the outer side of said door structure;

drive means for moving said sled means towards said door structure along the first path while said door structure is stationary and for moving said sled means and door structure together along the first path after impacting of said sled means against the outer side surface of said door structure;

means for guiding movement of said seat along a second path which is parallel with the first path; and connector means for connecting said door structure with said sled means for movement therewith along said first path after impacting of said sled means with the outer side surface of said door structure.

32. An apparatus for use with a test dummy to simulate vehicle side impacts, said apparatus comprising:

a first sled;

a door structure disposed in a first position on said first sled;

a seat disposed on said first sled adjacent to an inner side of said door structure to support the test dummy;

a second sled;

drive means for impacting said second sled against an outer side of said door structure, for moving said door structure relative to said first sled from the first position to a second position, and for moving said first sled upon movement of said door structure to the second position; and connector means for connecting said door structure with said second sled for movement of said door structure from the first position to the second position with said second sled.

33. An apparatus for use with a test dummy to simulate vehicle side impacts, said apparatus comprising:

a first sled;

a door structure disposed in a first position on said first sled;

a seat disposed on said first sled adjacent to an inner side of said door structure to support the test dummy;

a second sled;

drive means for impacting said second sled against an outer side of said door structure, for moving said door structure relative to said first sled from the first position to a second position, and for moving said first sled upon movement of said door structure to the second position; and connector means for connecting said door structure with said second sled upon impacting of said second sled against said door structure.

34. An apparatus as set forth in claim 33 further including means for supporting an air bag adjacent to said door structure and said seat.

35. An apparatus as set forth in claim 33 further including first track means for guiding movement of said second sled relative to said first sled, and second track means disposed on said first sled for guiding movement of said seat relative to said first sled, said second track means extending parallel to said first track means.

36. A method of simulating a vehicle side impact, said method comprising the steps of:

positioning a test dummy on a seat in a selected relationship with a door structure and a retracted air bag;

moving a sled toward the door structure with the test dummy disposed on the seat in the selected relationship with the door structure and the retracted air bag;

impacting the sled against the door structure; thereafter, connecting the door structure with the sled upon impacting of the sled against the door structure; and inflating the air bag.

37. A method as set forth in claim 36 wherein said step of moving the sled toward the door structure is performed with the door structure, seat, test dummy and retracted air bag stationary.

38. A method as set forth in claim 36 wherein said step of inflating the air bag is initiated in response to the sled moving to a predetermined position relative to the door structure.

39. A method as set forth in claim 36 wherein said step of inflating the air bag is initiated in response to the sled impacting against the door structure.

40. A method as set forth in claim 36 wherein said step of inflating the air bag includes inflating the air bag to an expanded condition in which at least a portion of the air bag is disposed between the seat and the door structure.

41. A method as set forth in claim 36 wherein said step of inflating the air bag includes inflating the air bag to an expanded condition in which at least a portion of the air bag is disposed between the test dummy and the door structure.

42. A method of simulating a vehicle side impact, said method comprising the steps of:

positioning a test dummy and a seat disposed on a first sled adjacent to an inner side of a door structure;

impacting a second sled against an outer side of the door structure:

moving the door structure relative to the first sled;

interconnecting the second sled and the door structure, said step of moving the door structure relative to the first sled being at least partially performed with the second sled and door structure interconnected;

impacting the second sled against the first sled; and moving the first sled.

43. An apparatus for use with a test dummy to simulate vehicle side impacts, said apparatus comprising:

a door structure for simulating a vehicle door;

a seat disposed adjacent to an inner side of said door structure for supporting the test dummy in a desired relationship with said door structure;

sled means for impacting against an outer side of said door structure to move said door structure relative to said seat; and alignment means connected with said door structure and said sled means for aligning said door structure with said sled means prior to impacting of said sled means against said door structure, said alignment means including a plurality of projections extending into space between said door structure and sled means prior to impacting of said sled means against said door structure and a plurality of surface means for defining a plurality of recesses which at least partially receive said projections prior to impacting of said sled means against said door structure.

44. An apparatus as set forth in claim 43 further including energy absorbing means for retarding movement of said door structure relative to said sled means upon impacting of said sled means against said door structure.

45. An apparatus as set forth in claim 43 further including support means for supporting said seat and said door structure, said support means including a first pair of tracks disposed on said support means to guide movement of said seat relative to said support means under the influence of force transmitted from said sled means through said door structure to said seat, and a second pair of tracks disposed in engagement with said support means and extending parallel to said first pair of tracks to guide movement of said support means under the influence of force transmitted from said sled means to said support means.

46. An apparatus as set forth in claim 43 further including energy absorbing means disposed between said sled means and said door structure for absorbing energy upon impacting of said sled means against said door structure.

47. An apparatus as set forth in claim 46 wherein said alignment means aligns said door structure and said sled means prior to absorption of energy by said energy absorbing means.

48. An apparatus as set forth in claim 43 further including means for supporting an air bag adjacent to said door structure and the test dummy.

49. An apparatus as set forth in claim 48 further including means for effecting inflation of said air bag from a folded condition to an expanded condition between said door structure and the test dummy upon impacting of said sled means against said door structure.

50. An apparatus as set forth in claim 43 further including means for guiding movement of said sled means along a first path extending transversely to the outer side of said door structure, and means for guiding movement of said seat along a second path which is parallel with the first path.

51. An apparatus as set forth in claim 43 further including means for supporting an air bag adjacent to said door structure and said seat, said means for supporting an air bag adjacent to said door structure and said seat maintains the relationship of the air bag to said door structure constant during movement of said sled means toward said door structure.

52. An apparatus for use with a test dummy to simulate vehicle side impacts, said apparatus comprising:

a first sled;

first track means for supporting said first sled and for guiding movement of said first sled;

a door structure disposed in a first position on said first sled;

a seat disposed on said first sled adjacent to an inner side of said door structure to support the test dummy;

second track means for guiding movement of said seat relative to said first sled; said second track means being disposed on said first sled and extending parallel to said first track means;

a second sled; and drive means for impacting said second sled against an outer side of said door structure.

53. An apparatus as set forth in claim 52 wherein said drive means is operable to impact said second sled against said door structure with sufficient force to move said seat along said second track means under the influence of force transmitted from said second sled through said door structure to said seat.

54. An apparatus as set forth in claim 53 wherein said drive means is operable to impact said second sled against said first sled with sufficient force to move said first sled along said first track means.

55. An apparatus as set forth in claim 52 further including a plurality of projections extending outwardly from a first one of said first and second sleds, and surface means connected with a second one of said first and second sleds for defining a plurality of recesses which at least partially receive said projections prior to impacting of said second sled against said door structure to align said first and second sleds.

56. An apparatus as set forth in claim 52 further including means for supporting an air bag adjacent to said door structure and said seat.

57. An apparatus for use with a test dummy to simulate vehicle side impacts, said apparatus comprising:

a first sled;

a door structure disposed in a first position on said first sled;

a seat disposed on said first sled adjacent to an inner side of said door structure to support the test dummy;

a second sled;

a plurality of projections extending outwardly from a first one of said first and second sleds;

drive means for impacting said second sled against an outer side of said door structure, for moving said door structure relative to said first sled from the first position to a second position, and for moving said first sled upon movement of said door structure to the second position; and surface means connected with a second one of said first and second sleds for defining a plurality of recesses which at least partially receive said projections prior to impacting of said second sled against said door structure.

58. An apparatus as set forth in claim 57 wherein said drive means is operable to impact said second sled against said first sled upon movement of said door structure to the second position.

59. An apparatus as set forth in claim 57 further including connector means for connecting said door structure with said second sled for movement of said door structure from the first position to the second position with said second sled.

60. An apparatus as set forth in claim 57 further including connector means for connecting said door structure with said second sled upon impacting of said second sled against said door structure.

61. An apparatus as set forth in claim 57 further including means for supporting an air bag adjacent to said door structure and said seat.

62. An apparatus as set forth in claim 57 further including first track means for guiding movement of said second sled relative to said first sled, and second track means disposed on said first sled for guiding movement of said seat relative to said first sled, said second track means extending parallel to said first track means.

63. A method of simulating a vehicle side impact, said method comprising the steps of:

positioning a test dummy in a selected relationship with a door structure with the test dummy on a seat disposed on a first track which is disposed on a first sled and which extends transversely to the door structure;

moving a second sled in a first direction toward the door structure with the test dummy on the seat in the selected relationship with the door structure;

impacting the second sled against the door structure;

moving the seat in the first direction along the first track on the first sled under the influence of force transmitted from the second sled; and moving the first sled in the first direction along a second track under the influence of force transmitted from the first sled.

64. A method of simulating a vehicle side impact, said method comprising the steps of:

positioning a test dummy on a seat in a selected relationship with a door structure;

moving a sled toward the door structure with the test dummy disposed on the seat in the selected relationship with the door structure;

aligning the door structure with the sled while performing said step of moving the sled toward the door structure, said step of aligning the door structure with the sled includes moving surfaces connected with the sled into sliding engagement with surfaces connected with the door structure; and impacting the sled against the door structure, said step of moving surfaces connected with the sled into sliding engagement with surfaces connected with the door structure being performed prior to impacting of the sled against the door structure.

* * * * *